US012420505B2

(12) United States Patent
Watanabe

(10) Patent No.: US 12,420,505 B2
(45) Date of Patent: Sep. 23, 2025

(54) METHOD OF MANUFACTURING PNEUMATIC TIRE

(71) Applicant: The Yokohama Rubber Co., LTD., Tokyo (JP)

(72) Inventor: Daisuke Watanabe, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 830 days.

(21) Appl. No.: 17/310,273

(22) PCT Filed: Dec. 11, 2019

(86) PCT No.: PCT/JP2019/048377
§ 371 (c)(1),
(2) Date: Jul. 27, 2021

(87) PCT Pub. No.: WO2020/158199
PCT Pub. Date: Aug. 6, 2020

(65) Prior Publication Data
US 2022/0134696 A1    May 5, 2022

(30) Foreign Application Priority Data

Feb. 1, 2019    (JP) .................................. 2019-017160

(51) Int. Cl.
*B29D 30/06*    (2006.01)
(52) U.S. Cl.
CPC .. *B29D 30/0606* (2013.01); *B29D 2030/0612* (2013.01)

(58) Field of Classification Search
CPC ........ B29D 30/0606; B29D 2030/0612; B29C 33/44
See application file for complete search history.

(56) References Cited

U.S. PATENT DOCUMENTS

2009/0120561 A1\*    5/2009    Yasunaga ........... B29D 30/0629
156/110.1

FOREIGN PATENT DOCUMENTS

| DE | 10 2014 212 346 A1 | 12/2015 |
| DE | 10 2017 221 699 A1 | 6/2019 |
| JP | 2003-285331 A | 10/2003 |
| JP | 2005-047202 A | 2/2005 |
| JP | 2005-066848 A | 3/2005 |
| JP | 2007210248 A \* | 8/2007 |
| JP | 2008-213773 A | 9/2008 |
| JP | 2008-307800 A | 12/2008 |
| JP | 2009-119624 A | 6/2009 |
| WO | 2018/029728 A1 | 2/2018 |

\* cited by examiner

*Primary Examiner* — Galen H Hauth
*Assistant Examiner* — Mohamed K Ahmed Ali
(74) *Attorney, Agent, or Firm* — Thorpe North & Western

(57) ABSTRACT

In a method of manufacturing a pneumatic tire, vulcanization is performed using a mold having a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold, and the ridge is cut by a cutter along the tire circumferential direction.

9 Claims, 7 Drawing Sheets

METHOD OF MANUFACTURING PNEUMATIC TIRE

TECHNICAL FIELD

The present technology relates to a method of manufacturing a pneumatic tire, and particularly relates to a method of manufacturing a pneumatic tire that can efficiently eliminate an unnecessary protrusion formed on a tire surface at a dividing position between a side plate and a sector, thereby obtaining a pneumatic tire with reduced air resistance.

BACKGROUND ART

During vulcanization of a pneumatic tire, a sectional type mold having a lower-side side plate and an upper-side side plate for forming sidewall portions, a lower-side bead ring and an upper-side bead ring for forming bead portions, and a plurality of sectors for forming a tread portion is commonly used (see, for example, Japan Unexamined Patent Publication Nos. 2003-285331, 2005-47202 and 2005-66848).

When vulcanization is performed using this type of mold, a step may be formed at a dividing position between a side plate and a sector because of the structure of the vulcanizer. In this case, a molding flash is formed at the dividing position between the side plate and the sector in the obtained pneumatic tire due to the step of the mold. In addition, since the sector is typically made of an aluminum alloy, the side plate is made of an iron alloy, and the thermal expansion states of the sector and the side plate are different from each other, even if the sector and the side plate are in close contact during mold closing, an overflow of the rubber may occur from the dividing position between the side plate and the sector. In this case, a film-like burr is formed along the tire circumferential direction at the dividing position of the side plate and the sector in the obtained pneumatic tire. Moreover, it is extremely difficult to cut off the film-like burr projecting from the tire surface.

Meanwhile, the unnecessary protrusion formed on the tire surface at the dividing position between the side plate and the sector are factors that increase the air resistance in driving conditions. Accordingly, from the perspective of reducing the rolling resistance of the pneumatic tire, there is a demand to make the protrusion projecting from the profile line of the sidewall portion as small as possible.

SUMMARY

The present technology provide a method of manufacturing a pneumatic tire that can efficiently eliminate an unnecessary protrusion formed on a tire surface at a dividing position between a side plate and a sector, thereby obtaining a pneumatic tire with reduced air resistance.

A method of manufacturing a pneumatic tire according to an embodiment of the present technology includes performing vulcanization by using a mold including a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold, and cutting the ridge by a cutter along the tire circumferential direction.

According to an embodiment of the present technology, by providing chamfered portions respectively at edge portions of a side plate and a sector abutted against each other, a ridge extending in a tire circumferential direction is formed at a dividing position of the side plate and the sector in the pneumatic tire as a cutting margin, and the ridge is cut by a cutter along the tire circumferential direction. The ridge intentionally formed based on the chamfered portions is more rigid than a film-like burr, and thus can be stably and easily cut off by the cutter. In this way, a pneumatic tire that can efficiently eliminate an unnecessary protrusion formed on the tire surface at the dividing position between the side plate and the sector, thereby reducing air resistance is easily obtained.

According to an embodiment of the present technology, a shortest distance from a virtual vertex of an edge portion of the sector to a recess portion or a protrusion portion formed on a molding surface of the sector is preferably not less than 2 mm. By sufficiently ensuring the shortest distance from the virtual vertex of the edge portion of the sector to the recess portion or the protrusion portion formed on the molding surface as described above, cutting operation of the ridge by the cutter can be easily performed.

A width of each of the chamfered portions is preferably in a range of from 1.0 mm to 2.0 mm, and a depth of each of the chamfered portions is preferably in a range of from 0.5 mm to 2.0 mm. Setting the widths and depths of the chamfered portions to the ranges described above makes it possible to provide the ridge with an appropriate rigidity, and cutting operation of the ridge by the cutter can be easily performed.

A radius of curvature Rs of a chamfered portion formed on the side plate is preferably in a range of from 0.3 mm to 2.0 mm, and a radius of curvature Rt of a chamfered portion formed on the sector is preferably in a range of from 0.5 mm to 5.0 mm. In particular, the radius of curvature Rt of the chamfered portion formed on the sector is preferably greater than the radius of curvature Rs of the chamfered portion formed on the side plate. Setting the radii of curvature Rs, Rt of the chamfered portions to the ranges described above makes it possible to provide the ridge with an appropriate shape, and cutting operation of the ridge by the cutter can be easily performed.

When a virtual vertex of an edge portion of the side plate is A, a virtual vertex of an edge portion of the sector is B, an inner side of the virtual vertex B in the tire width direction is minus, and an outer side of the virtual vertex B in the tire width direction is plus, the virtual vertex A is preferably in a range of from −0.5 mm to +0.3 mm with respect to the virtual vertex B. Setting the positional relationship of the virtual vertices A, B to the ranges described above makes it possible to provide the ridge with an appropriate shape, and cutting operation of the ridge by the cutter can be easily performed.

DETAILED DESCRIPTION

Figure 1:
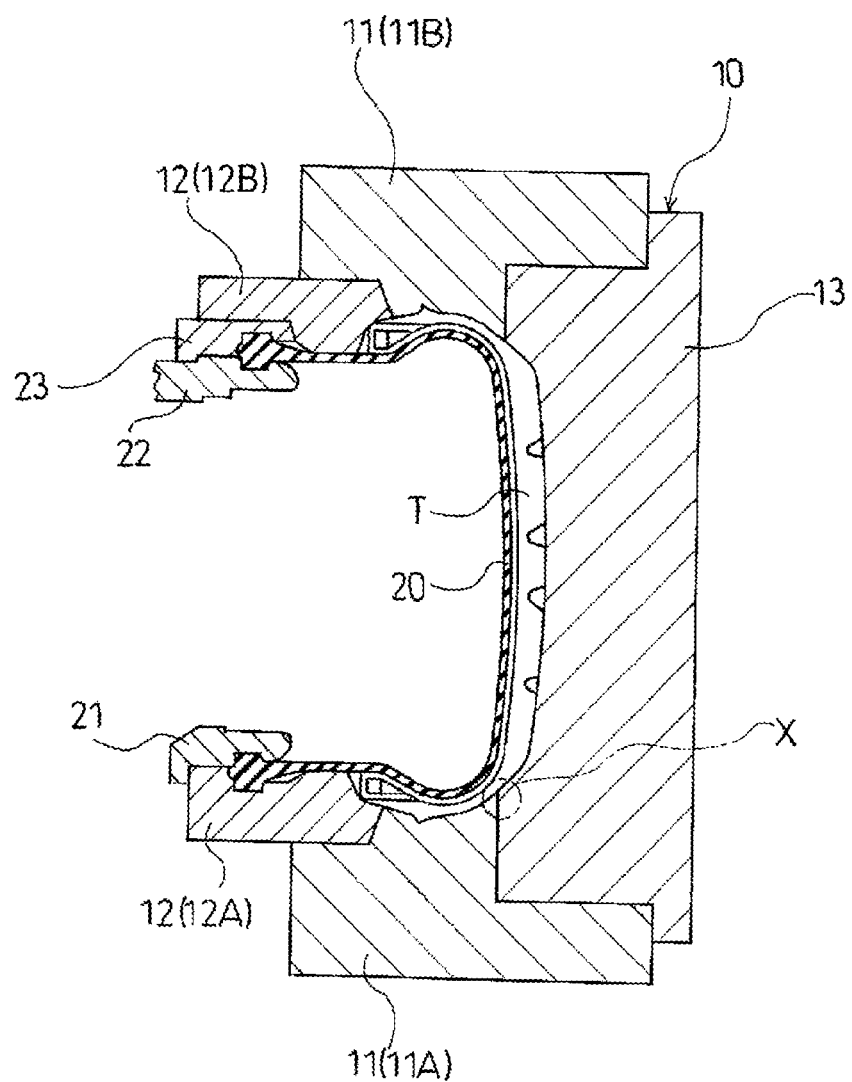
FIG. 1 is a meridian cross-sectional view illustrating a tire vulcanization device used in an embodiment of the present technology.
Figure 2:
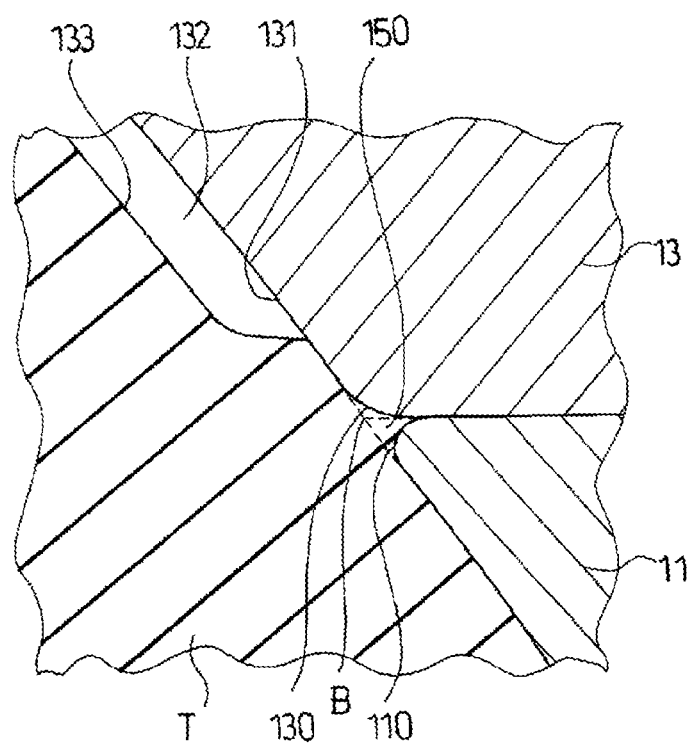
FIG. 2 is an enlarged cross-sectional view illustrating a mold main portion (X portion) in the tire vulcanization device of FIG. 1.
Figure 3:
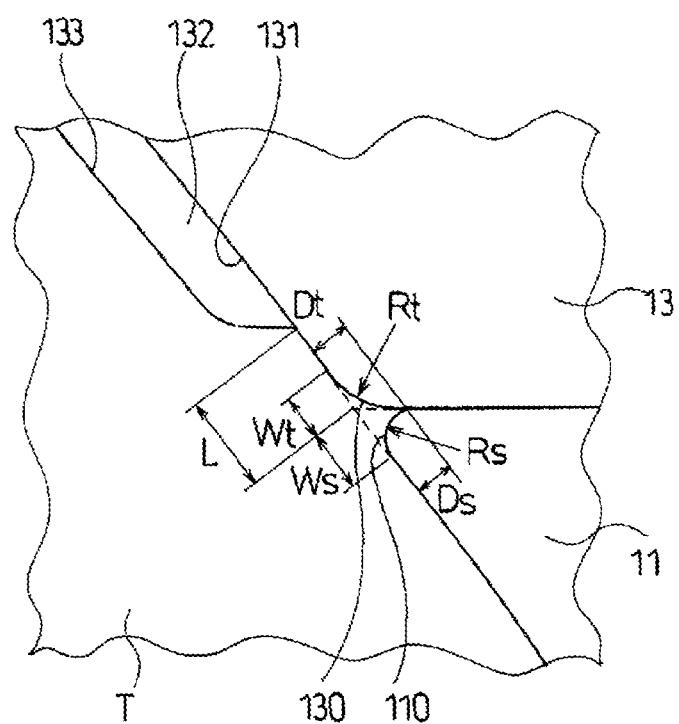
FIG. 3 is an enlarged cross-sectional view illustrating a mold main portion (X portion) in the tire vulcanization device of FIG. 1, with dimensional lines.

Configurations of embodiments of the present technology will be described in detail below with reference to the accompanying drawings. FIG. 1 illustrates a tire vulcanization device used in an embodiment of the present technology, and FIGS. 2 and 3 illustrate mold main portions thereof.

As illustrated in FIG. 1, the tire vulcanization device includes a mold 10 that forms an outer surface of a pneumatic tire T, and a bladder 20 having a cylindrical shape insertable inside the pneumatic tire T. Also, the tire vulcanization device includes a heating/pressurizing medium supply means, which is not illustrated, for supplying a heating/pressurizing medium such as steam into the bladder 20, and a heating means, which is not illustrated, for heating the mold 10.

The mold 10 includes a pair of side plates 11 (a lower-side side plate 11A and an upper-side side plate 11B) for forming sidewall portions of the pneumatic tire T, a pair of bead rings 12 (a lower-side bead ring 12A and an upper-side bead ring 12B) for forming bead portions of the pneumatic tire T, and a plurality of sectors 13 for forming a tread portion of the pneumatic tire T, and the pneumatic tire T is vulcanization molded inside the mold 10.

The bladder 20 is gripped at its lower end between the lower-side bead ring 12A and a lower-side clamping ring 21 and at its upper end between an upper-side clamping ring 22 and an auxiliary ring 23. In the vulcanization state illustrated in FIG. 1, the bladder 20 is in its expanded state toward an outer side in the radial direction of the pneumatic tire T, however, during removal of the pneumatic tire T from the mold 10 after the vulcanization, the upper-side clamping ring 22 moves upward, and accordingly the bladder 20 is removed from inside the pneumatic tire T.

The heating/pressurizing medium supplying means, which is not illustrated, is configured to supply steam adjusted to a predetermined temperature and pressure and nitrogen gas adjusted to a predetermined pressure as a heating/pressurizing medium on a timely basis. By introducing such a heating/pressurizing medium into the bladder 20, the pneumatic tire T is pressed from inside toward the inner surface of the mold 10 based on the pressure. Note that only steam may be used as the heating/pressurizing medium.

The heating means, which is not illustrated, is attached to the lower-side side plate 11A, the upper-side side plate 11B, and the sector 13 that constitute the mold 10 to perform the vulcanization of the pneumatic tire T by heating the mold 10 with the heating means.

As illustrated in FIGS. 2 and 3, in the tire vulcanization device configured as described above, chamfered portions 110, 130 are formed respectively at edge portions of the side plate 11 and the sector 13 abutted against each other that constitute the mold 10. Each of the chamfered portions 110, 130 has a cross-sectional shape having an arc shape that projects toward inside the mold 10, and is continuously formed along the tire circumferential direction at the dividing position between the side plate 11 and the sector 13. In FIGS. 2 and 3, the dashed line portions illustrate the side plate 11 and the sector 13 in a state where no chamfering machining has been performed. Point B is a virtual vertex of an edge portion of the sector 13. In addition, a lug groove forming rib 132 is formed, for example, on a molding surface 131 of the sector 13, and the lug groove forming rib 132 allows a lug groove 133 extending in the tire lateral direction to be formed in the tread portion of the pneumatic tire T.

When a pneumatic tire T is vulcanized using the tire vulcanization device described above, an unvulcanized pneumatic tire T is fed into the mold 10, the bladder 20 is inserted inside the pneumatic tire T, a heating/pressurizing medium is introduced into the bladder 20 while the mold 10 is heated from outside to vulcanize the pneumatic tire T. As a result, a ridge 150 extending along the chamfered portions 110, 130 in the tire circumferential direction are formed at the dividing position between the side plate 11 and the sector 13 in the pneumatic tire T vulcanized in the mold 10. The ridge 150 has a cross-sectional shape having a generally triangular shape that corresponds to the cross-sectional shapes of the chamfered portions 110, 130.

Figure 4:
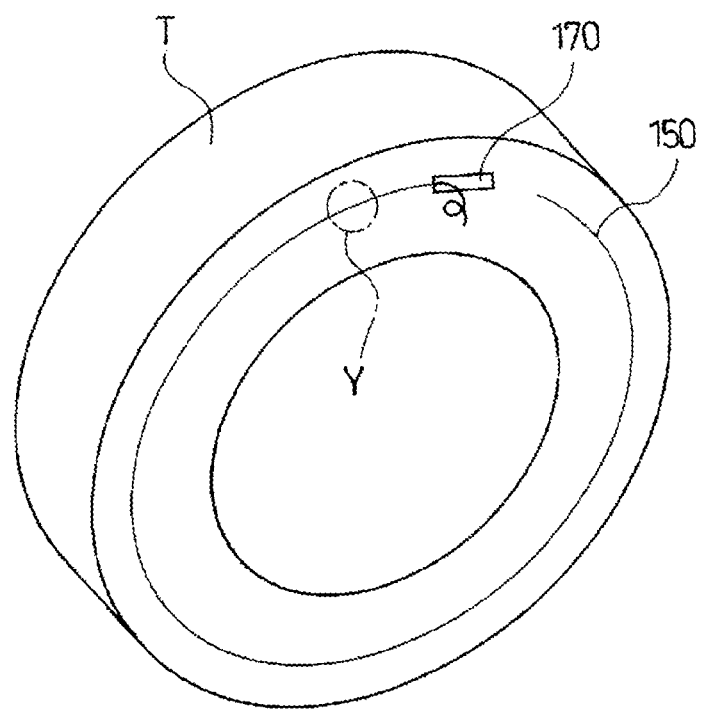
FIG. 4 is a perspective view illustrating a step of cutting a ridge formed at a dividing position of a side plate and a sector in a pneumatic tire.
Figure 5:
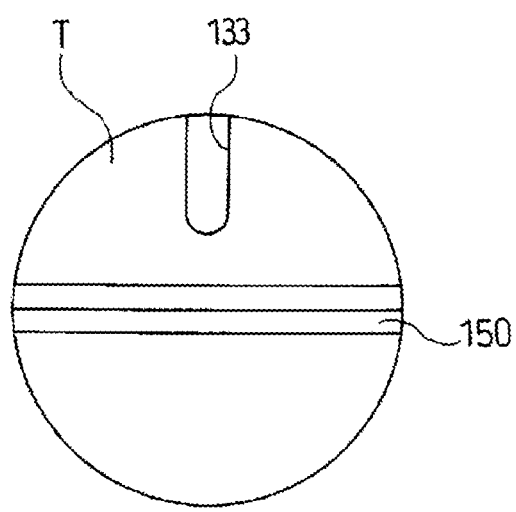
FIG. 5 is a side view illustrating a detail (Y portion) of the pneumatic tire of FIG. 4.

FIG. 4 illustrates a step of cutting a ridge, and FIG. 5 illustrates a detail thereof. As illustrated in FIGS. 4 and 5, the ridge 150 extending in the tire circumferential direction is formed at the dividing position between the side plate 11 and the sector 13 in the pneumatic tire T. Such a ridge 150 is cut along the tire circumferential direction by a cutter 170. At the time, the cutter 170 may be manually moved along the tire circumferential direction or may be moved along the tire circumferential direction by a machine. Alternatively, the cutter 170 may be fixed while the pneumatic tire T is rotated. There is no particular limitation on the structure of the cutter 170, and any type of blade can be used. The ridge 150 having a cross-sectional shape having a generally triangular shape can be cut off at any position in the height direction (the profile normal direction), however, cutting off at a position close to the tire surface might damage the tire surface, and cutting off at a position far away from the tire surface might make the ridge 150 have lesser rigidity, and thus make it difficult to cut. Thus, it is desirable to cut the ridge 150 at an appropriate height position.

In the method of manufacturing the pneumatic tire T described above, by providing chamfered portions 110, 130 respectively at the edge portions of the side plate 11 and the sector 13 abutted against each other, a ridge 150 extending in the tire circumferential direction are formed at the dividing position of the side plate 11 and the sector 13 in the pneumatic tire T as a cutting margin, and the ridge 150 is cut by a cutter 170 along the tire circumferential direction. The ridge 150 intentionally formed based on the chamfered portions 110, 130 is more rigid than a film-like burr formed unintentionally by ingress of rubber into the gap between the side plate 11 and the sector 13, and thus can be stably and easily cut off by the cutter 170. In this way, an unnecessary protrusion formed on the tire surface at the dividing position between the side plate 11 and the sector 13 can be efficiently eliminated. Accordingly, a pneumatic tire with reduced air resistance can be easily obtained.

As illustrated in FIGS. 2 and 3, in the mold 10 described above, a shortest distance L from a virtual vertex B of an edge portion of the sector 13 to a recess portion or a protrusion portion (in the present embodiment, a groove forming rib 132) formed on the molding surface 131 of the sector 13 is preferably not less than 2 mm. In other words, in the pneumatic tire T, a flat region having a band shape is preferably formed along the ridge 150 formed in the dividing position between the side plate 11 and the sector 13, without a protrusion portion or a recess portion due to grooves, decorative characters, and the like. By sufficiently ensuring the shortest distance L from the virtual vertex B of the edge portion of the sector 13 to the recess portion or the protrusion portion formed on the molding surface 131 of the sector 13 as described above, the cutter 170 is prevented from catching on the recess portions and protrusion portions, and cutting operation of the ridge 150 by the cutter 170 can be easily performed. It is not necessary that the shortest distance L be not less than 2 mm, but it should be avoided that a protrusion portion with a height of 0.3 mm or more, or a recess portion with a depth of 0.3 mm or more be disposed in a region within 2 mm from the virtual vertex B of the edge portion of the sector 13.

As illustrated in FIG. 3, preferably, a width Ws of the chamfered portion 110 of the side plate 11 and a width Wt of the chamfered portion 130 of the sector 13 are each in a range of from 1.0 mm to 2.0 mm, and the depth Ds of the chamfered portion 110 of the side plate 11 and the depth Dt of the chamfered portion 130 of the sector 13 are each in a range of from 0.5 mm to 2.0 mm. The depths Ds, Dt of the chamfered portions 110, 130 are the depths in the profile normal direction. Setting the widths Ws, Wt and depths Ds, Dt of the chamfered portions 110, 130 to the ranges described above makes it possible to provide the ridge 150 with an appropriate rigidity, and cutting operation of the ridge 150 by the cutter 170 can be easily performed.

Here, when the widths Ws, Wt of the chamfered portions 110, 130 are greater than 2.0 mm, the rigidity of the ridge 150 will be excessive, making it difficult to cut, and conversely, when the width Ws, Wt of the chamfered portions 110, 130 are less than 1.0 mm, the rigidity of the ridge 150 will become insufficient, making it difficult to cut. Furthermore, when the depth Ds, Dt of the chamfered portions 110, 130 are less than 0.5 mm, cutting the ridge 150 by the cutter 170 becomes difficult, and conversely, when the depth Ds, Dt are greater than 2.0 mm, the cut pieces that are to be discarded will be unnecessarily large. Note that when the dimensions of each of the chamfered portions 110, 130 are set to be within the ranges described above, even in a case where a slight deviation occurs between the side plate 11 and the sector 13 during mold closing, a suitable ridge 150 can be formed as a cutting margin.

A radius of curvature Rs of the chamfered portion 110 formed on the side plate 11 is preferably in the range of from 0.3 mm to 2.0 mm, and a radius of curvature Rt of the chamfered portion 130 formed on the sector 13 is preferably in a range of from 0.5 mm to 5.0 mm. In particular, the radius of curvature Rt of the chamfered portion 130 formed on the sector 13 is preferably greater than the radius of curvature Rs of the chamfered portion 110 formed on the side plate 11. This is because, when considering the common tire profile shape, the edge portion on the side plate 11 side forms an acute angle in a meridian cross-section, and the edge portion on the sector 13 side forms an obtuse angle in a meridian cross-section. Setting the radii of curvature Rs, Rt of the chamfered portions 110, 130 to the ranges described above makes it possible to provide the ridge 150 with an appropriate shape, and cutting operation of the ridge 150 by the cutter 170 can be easily performed.

Here, when the radius of curvature Rs of the chamfered portion 110 formed on the side plate 11 is less than 0.3 mm, the height of the ridge 150 is constrained, and conversely, when the radius of curvature Rs is greater than 2.0 mm, the rigidity of the ridge 150 will be excessive, making it difficult to cut. Furthermore, when the radius of curvature Rt of the chamfered portion 130 formed in the sector 13 is less than 0.5 mm, the height of the ridge 150 is constrained, and conversely, when the radius of curvature Rt is greater than 5.0 mm, the rigidity of the ridge 150 will be excessive, making it difficult to cut.

Figure 6:
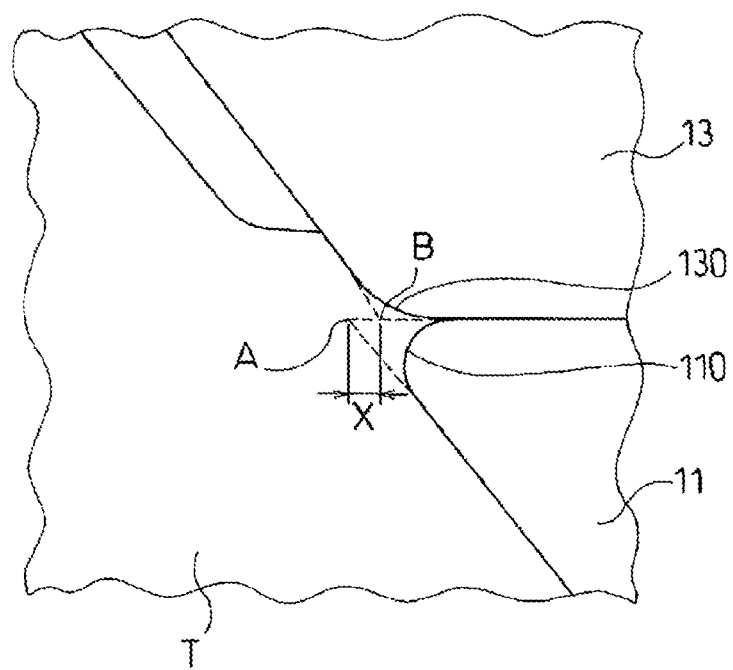
FIG. 6 is a cross-sectional view illustrating a modified example of a mold main portion in the tire vulcanization device.
Figure 7:
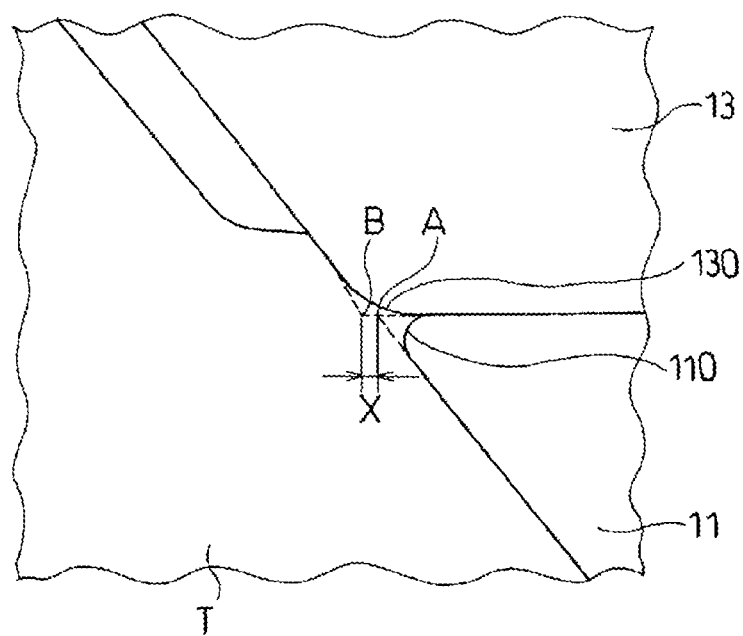
FIG. 7 is a cross-sectional view illustrating another modified example of a mold main portion in the tire vulcanization device.

FIGS. 6 and 7 each illustrate modified examples of a mold main portion in the tire vulcanization device. Since these embodiments are identical to the embodiment described above except the arrangement of the side plate 11 and the sector 13, the identical reference sign will be assigned to the identical parts, and detailed descriptions thereof will be omitted. In FIGS. 6 and 7, when a virtual vertex of an edge portion of the side plate 11 is A, a virtual vertex of an edge portion of the sector 13 is B, an inner side of the virtual vertex B in the tire width direction is minus, and an outer side of the virtual vertex B in the tire width direction is plus, the distance X between the virtual vertex A and the virtual vertex B is preferably in a range of from −0.5 mm to +0.3. The distance X is a distance measured along the direction of the dividing surface between the side plate 11 and the sector 13.

As illustrated in FIG. 6, it is possible to dispose the virtual vertex A of the edge portion of the side plate 11 on the inner side of the virtual vertex B of the edge portion of the sector 13 in the tire lateral direction, or as illustrated in FIG. 7, to dispose the virtual vertex A of the edge portion of the side plate 11 on the outer side of the virtual vertex B of the edge portion of the sector 13 in the tire lateral direction. In these cases, setting the distance L between the virtual vertices A, B to the ranges described above makes it possible to provide the ridge 150 with an appropriate shape, and cutting operation of the ridge 150 by the cutter 170 can be easily performed. In particular, as shown in FIG. 6, in the case in which a structure in which the virtual vertex A of the edge portion of the side plate 11 is disposed on the inner side of the virtual vertex B of the edge portion of the sector 13 in the tire lateral direction, the cutting workability of the ridge 150 can be increased. Here, when the distance X between the virtual vertex A and the virtual vertex B deviates from the range of from −0.5 mm to +0.3 mm, it is not possible to provide the ridge 150 with an appropriate shape, and thus makes it difficult to cut.

In the embodiment described above, a case has been described in which the dividing position between the side plate 11 and the sector 13 is set near the shoulder portion of the pneumatic tire T, the dividing position of the side plate 11 and the sector 13 may be in the vicinity of the tire maximum width position.

EXAMPLES

For performing vulcanization of a pneumatic tire having a tire size of 225/55R17 using a mold having a side plate for forming a sidewall portion and a sector for forming a tread portion, the structure of the mold was varied (Conventional Example, Comparative Example 1, and Examples 1 to 4).

In Conventional Example, the chamfered portions were formed on only the edge portion of the side plate of the edge portions of the side plate and the sector abutted against each other. In Comparative Example 1, chamfer portions were not formed on the edge portions of the side plate and the sector abutted against each other. In Examples 1 to 4, chamfer portions were formed respectively at edge portions of the side plate and the sector abutted against each other.

In Conventional Example, Comparative Example 1, and Examples 1 to 4, the shortest distance L from the virtual vertex of the edge portion of the sector to the lug groove forming rib formed on the molding surface of the sector, the width Ws of the chamfered portion of the side plate, the width Wt of the chamfered portion of the sector, the depth Ds of the chamfered portion of the side plate, the depth Dt of the chamfered portion of the sector, the radius of curvature Rs of the chamfered portion of the side plate, the radius of curvature Rt of the chamfered portion of the sector, and the distance X between the virtual vertex A of the edge portion of the side plate and the virtual vertex B of the edge portion of the sector were set as shown in Table 1.

By the methods of manufacturing of Conventional Example, Comparative Example 1, and Examples 1 to 4 described above, for each example, 60 pneumatic tires were vulcanized, and for each tire, the protrusion (a ridge or a burr) formed at the dividing position between the side plate and the sector was trim cut by a cutter, and the height of the step (cut left) on the tire surface was measured, and the average value of 60 tires was determined. Also, for 60 tires, the total time taken by the trim cut on the front side and the back side was measured, and the average work time per tire was determined. The results are shown in Table 1.

As can be learned from Table 1, in Examples 1 to 4, compared to Conventional Example, the ridge formed in the dividing position between the side plate and the sector was able to be efficiently cut off, and the step formed at that portion was able to be made as small as possible. In contrast, in Comparative Example 1, a film-like burr was formed along the tire circumferential direction at the dividing position between the side plate and the sector in the pneumatic tire, and it was practically impossible to trim such a burr by the cutter.

The invention claimed is:

1. A method of manufacturing a pneumatic tire, comprising:

performing vulcanization by using a mold comprising a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold; and cutting the ridge by a cutter along the tire circumferential direction, wherein

TABLE 1-1

|  | Conventional Example | Comparative Example 1 | Example 1 |
|---|---|---|---|
| Chamfered portion of side plate | Yes | No | Yes |
| Chamfered portion of sector | No | No | Yes |
| Shortest distance L from virtual vertex B to lug groove forming rib (mm) | 0 | 0 | 0 |
| Width Ws of chamfered portion of side plate (mm) | 1.1 | 0 | 2.3 |
| Width Wt of chamfered portion of sector (mm) | 0 | 0 | 1.7 |
| Depth Ds of chamfered portion of side plate (mm) | 1.0 | 0 | 1.7 |
| Depth Dt of chamfered portion of sector (mm) | 0 | 0 | 1.4 |
| Radius of curvature Rs of chamfered portion of side plate (mm) | 1.0 | — | 1.0 |
| Radius of curvature Rt of chamfered portion of sector (mm) | — | — | 3.0 |
| Distance X between virtual vertex A and virtual vertex B (mm) | +0.5 | +0.5 | +0.5 |
| Height of step after trim cut (mm) | 0.7 | — | 0.7 |
| Average work time of trim cut (seconds) | 15 | — | 10 |

TABLE 1-2

|  | Example 2 | Example 3 | Example 4 |
|---|---|---|---|
| Chamfered portion of side plate | Yes | Yes | Yes |
| Chamfered portion of sector | Yes | Yes | Yes |
| Shortest distance L from virtual vertex B to lug groove forming rib (mm) | 2 | 2 | 2 |
| Width Ws of chamfered portion of side plate (mm) | 2.3 | 1.2 | 1.2 |
| Width Wt of chamfered portion of sector (mm) | 1.7 | 0.7 | 0.7 |
| Depth Ds of chamfered portion of side plate (mm) | 1.7 | 1.0 | 1.0 |
| Depth Dt of chamfered portion of sector (mm) | 1.4 | 0.8 | 0.8 |
| Radius of curvature Rs of chamfered portion of side plate (mm) | 1.0 | 0.5 | 0.5 |
| Radius of curvature Rt of chamfered portion of sector (mm) | 3.0 | 2.5 | 2.5 |
| Distance X between virtual vertex A and virtual vertex B (mm) | +0.5 | +0.5 | −0.3 |
| Height of step after trim cut (mm) | 0.6 | 0.5 | 0.1 |
| Average work time of trim cut (seconds) | 8 | 8 | 8 | a shortest distance from a virtual vertex of an edge portion of the sector to a recess portion or a protrusion portion formed on a molding surface of the sector is not less than 2 mm.

2. A method of manufacturing a pneumatic tire, comprising:

performing vulcanization by using a mold comprising a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold; and cutting the ridge by a cutter along the tire circumferential direction, wherein a width of each of the chamfered portions is in a range of from 1.0 mm to 2.0 mm, and a depth of each of the chamfered portions is in a range of from 0.5 mm to 2.0 mm.

3. A method of manufacturing a pneumatic tire, comprising:

performing vulcanization by using a mold comprising a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold; and cutting the ridge by a cutter along the tire circumferential direction, wherein a radius of curvature Rs of a chamfered portion formed on the side plate is in a range of from 0.3 mm to 2.0 mm, and a radius of curvature Rt of a chamfered portion formed on the sector is in a range of from 0.5 mm to 5.0 mm.

4. The method of manufacturing a pneumatic tire according to claim 3, wherein the radius of curvature Rt of the chamfered portion formed on the sector is greater than the radius of curvature Rs of the chamfered portion formed on the side plate.

5. A method of manufacturing a pneumatic tire, comprising:

performing vulcanization by using a mold comprising a side plate for forming a sidewall portion of the pneumatic tire and a sector for forming a tread portion of the pneumatic tire, and in which chamfered portions are formed respectively at edge portions of the side plate and the sector abutted against each other, to form a ridge extending along the chamfered portions in a tire circumferential direction at a dividing position between the side plate and the sector in the pneumatic tire vulcanized in the mold; and cutting the ridge by a cutter along the tire circumferential direction, wherein when a virtual vertex of an edge portion of the side plate is virtual vertex A, a virtual vertex of an edge portion of the sector is virtual vertex B, an inner side of the virtual vertex B in a tire width direction is minus, and an outer side of the virtual vertex B in the tire width direction is plus, the virtual vertex A is in a range of from −0.5 mm to +0.3 mm with respect to the virtual vertex B.

6. The method of manufacturing a pneumatic tire according to claim 1, wherein a width of each of the chamfered portions is in a range of from 1.0 mm to 2.0 mm, and a depth of each of the chamfered portions is in a range of from 0.5 mm to 2.0 mm.

7. The method of manufacturing a pneumatic tire according to claim 6, wherein a radius of curvature Rs of a chamfered portion formed on the side plate is in a range of from 0.3 mm to 2.0 mm, and a radius of curvature Rt of a chamfered portion formed on the sector is in a range of from 0.5 mm to 5.0 mm.

8. The method of manufacturing a pneumatic tire according to claim 7, wherein the radius of curvature Rt of the chamfered portion formed on the sector is greater than the radius of curvature Rs of the chamfered portion formed on the side plate.

9. The method of manufacturing a pneumatic tire according to claim 8, wherein when a virtual vertex of an edge portion of the side plate is virtual vertex A, a virtual vertex of an edge portion of the sector is virtual vertex B, an inner side of the virtual vertex B in a tire width direction is minus, and an outer side of the virtual vertex B in the tire width direction is plus, the virtual vertex A is in a range of from −0.5 mm to +0.3 mm with respect to the virtual vertex B.

\* \* \* \* \*